(No Model.)
M. LESTER.
FISH HOOK ATTACHMENT.
No. 372,686. Patented Nov. 8, 1887.
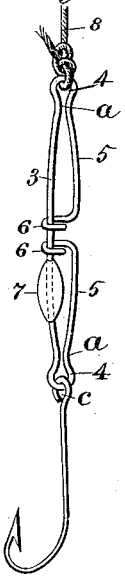
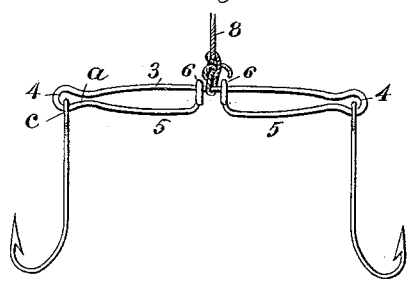
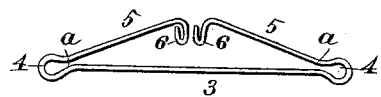
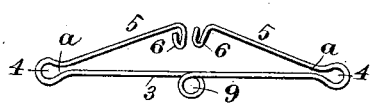
Witnesses
Inventor
Milton Lester
By his Attorneys

UNITED STATES PATENT OFFICE.

MILTON LESTER, OF INAVALE, NEBRASKA.

FISH-HOOK ATTACHMENT.

SPECIFICATION forming part of Letters Patent No. 372,686, dated November 8, 1887.

Application filed August 29, 1887. Serial No. 248,113. (No model.)

*To all whom it may concern:*

Be it known that I, MILTON LESTER, a citizen of the United States, residing at Inavale, in the county of Webster and State of Nebraska, have invented new and useful Improvements in Fish-Hook Attachments, of which the following is a specification.

This invention relates to means for connecting a fish-hook to a fish-line, the object being to provide an improved metallic attachment for securing a fish hook or hooks to a line; and the invention consists in the peculiar construction and arrangement of the metallic fish-hook attachment, all as hereinafter fully described, and pointed out in the claim.

In the drawings forming part of this specification, Figure 1 is a perspective view of a fish-hook attachment constructed according to my invention, showing a hook pending from one end and a piece of fish line attached to the opposite end thereof. Fig. 2 is a side elevation of the fish-hook attachment, showing a hook attached to each end thereof and a part of a fish-line connected thereto intermediately between its ends. Fig. 3 is a perspective view of said hook attachment, with its spring-arms disconnected from the body thereof, or its main bar. Fig. 4 is a similar view to Fig. 3, but showing a slightly-modified construction, which is hereinafter fully described.

The essential object of this invention is to provide an improved metallic connection between the end of a fish-line and the fish-hook to serve as a substitute for the usual snell, whereby the hook is conveniently attached to the fish-line without knotting or winding the latter, and a broken hook is easily replaced by another, and either one or two hooks may be used on one attachment, the latter at the same time providing for attaching thereto a requisite sinker. By the use of the within-described metallic hook attachment all danger of the hook being bitten from the line by the fish is obviated, and an unusually strong connection is made between the latter and the hook.

The within-described fish-hook attachment is constructed from a single piece of suitable spring-wire, either of brass or steel, and when made of the latter its surface is suitably protected against oxidation by plating. Said attachment consists of the main bar or line 3, each of whose ends is bent to form an eye, 4, and at the extremity of each of said ends which, from said eye 4, constitutes a spring-arm, 5, is formed a hook, 6, capable of being engaged around said bar 3 about midway between the ends of the hook attachment, as shown in Figs. 1 and 2. The said spring-arms 5 are, when the hooks 6 are engaged with the bar 3, brought nearly parallel with said bar, and that portion of the latter and of the spring-arm 5 at *a*, near said eye 4, are brought so near together that the eye *c* of the fish-hook cannot pass between the parts of said bar and arm at *a*, and hence the hook is forced to remain in the eye 4 of the attachment, and is prevented from sliding either on the bar or on one of said arms. A sinker, 7, of lead, is fixed on the bar 3 in the position shown in Fig. 1; or the attachment may be used without said sinker under certain conditions relative to fishing in deep or shallow water, or in that where the currents are rapid or otherwise. When the hooks 6 on the ends of the arms 5 are disengaged from the bar 3, as shown in Figs. 3 and 4, they spring to the positions shown in the last-named figures, and then the parts *a* of the spring-arms and bar 3 separate sufficiently to permit of putting on or taking off a hook, the eye of the latter being passed over the end of the hook 6 and along the arm 5 into the eye 4.

The hook attachment may be used by connecting the fish-line 8 to one end of the attachment, as shown in Fig. 1, with one hook at the opposite end; or a hook may be connected at each end of the attachment and the line be attached to the bar 3 between the hooks 6, as shown in Fig. 2; but a preferable construction of the attachment, when it is to be used with two hooks, is that shown in Fig. 4, wherein an eye, 9, is formed centrally between the ends of the bar 3, to which the end of the fish-line 8 is attached, and thereby the end of the line is more securely held in a central position between the opposite ends of the attachment.

What I claim as my invention is—

A fish-hook attachment consisting of the bar 3, the spring-arms 5, the ends thereof having a hook engagement with said bar, the eyes 4 at the junction of said bar and arms, said bar and the arm 5 being deflected toward each other at $a$ to contract the opening from said eye, whereby a hook is retained therein, substantially as set forth.

MILTON LESTER.

Witnesses:
G. M. CHAMBERLAIN,
H. A. CHAPIN.